Patented Jan. 27, 1942

2,270,959

UNITED STATES PATENT OFFICE 2,270,959

STABILIZATION OF SYNTHETIC RUBBER-LIKE MATERIALS

Hans Murke, Leverkusen-Schlebusch, and Wilhelm Becker, Cologne, Germany, assignors to I. G. Farbenindustrie Aktiengesellschaft, Frankfort-on-the-Main, Germany No Drawing. Application September 27, 1939, Serial No. 296,810. In Germany October 14, 1938

3 Claims. (Cl. 260—42)

The present invention relates to a new process for stabilizing synthetic rubber-like materials prepared by the polymerization of butadienes-1.3.

It is known that synthetic rubber-like materials of the character described are liable to a self-hardening. This is probably due to a linking of the individual chains with the formation of cyclic compounds. In consequence of this "cyclicisation" the working of these products on the roller is connected with considerable difficulties and expenses and, moreover, the mechanical properties of the vulcanizates obtained therefrom are impaired. Apart from this phenomenon, the polymerizates of the character described show the undesired property of being attacked by the oxygen of the air.

Many attempts have been made to avoid these disadvantages by the addition of stabilizing agents. To this end there have been incorporated within the polymerizates of the character described aromatic secondary amines, polyvalent aromatic hydroxy compounds and finally aldehyde-amine condensation products. All products of this type though exerting some stabilizing effect involve the disadvantage of impairing the stability towards light. In consequence thereof, no clear success has been reached up to the present time.

Other stabilizing agents, for instance those described and claimed in the application Ser. No. 181,604 to Ingofroh Dennstedt and Harro Hagen and Wilhelm Becker filed December 24, 1937, though being free from the above disadvantages show a disagreeable odor which may be such as to prevent their practical use.

It is the object of our present invention to develop new auxiliary agents which show a good stabilizing action without impairing the fastness to light and are free from any objectionable odor thus allowing the preparation of light-colored and non-smelling rubber materials.

Our new stabilizers may be defined as products of the condensition of aldehydes or ketones with phenols or naphthols, as far as such products are still soluble in organic solvents. Stabilizers of the character described, if incorporated within polymerizates of butadienes-1.3 prior to storing, meet every practical demand with respect to the stabilizing action, with respect to fastness towards light of the vulcanizates and with respect to the odor. As synthetic rubber-like materials which may be stabilized in accordance with the present invention there may be mentioned the polymerizates of butadiene, isoprene, dimethylbutadienes, 2-chlorobutadiene, and finally the products of the conjoint polymerization of such butadienes with other polymerizable substances such as styrene or acrylic acid nitrile. The incorporation of the stabilizers within these synthetic rubber-like materials can be effected in a solid state, for instance, on the roller. The simplest way is to add the stabilizers either dissolved in alkalies or in form of an aqueous suspension, to the polymerizates obtained in form of a latex according to the emulsion polymerization.

The following details serve to more fully explain the nature and the efficacy of our new stabilizers. First of all, they must be capable of being dissolved by organic solvents as insoluble products, owing to their too high degree of condensation, would be unsuitable for the purpose in question. The required properties can be easily regulated in a manner known per se by controlling the conditions of temperature and by a suitable choice of the starting materials and of the catalysts. Preference is given to those products having been prepared in an acid medium and being soluble in alkalies, as such products can be most easily incorporated within the emulsion polymerizates, viz. in form of an aqueous alkaline solution. Generally speaking, products of the so-called "Novolak"-type are most suitable for the purpose of our invention. Also the lowest members of the condensation, for instance, those which are composed of 2 mols of phenols and 1 mol of aldehyde, of 3 mols of phenols and 2 mols of aldehydes and of 4 mols of phenols and 3 mols of aldehydes, have proved to be effective though, in practical working, mixtures of the various condensation products are employed, as the isolation of the various uniform compounds from such mixtures is connected with considerable difficulties. We wish to point out that in case of working with mixtures of the character described the excess unchanged phenol or naphthol should be removed by distillation in vacuo. In accordance with a preferred form of our invention we are working with hydrogenated condensation products of the character described, i. e. with such products as have been subjected to a hydrogenating treatment subsequent to condensation and, if desired, to purification. Amongst the hydrogenated products those must be chosen which have taken up at the most 50% of the hydrogen necessary for effecting complete hydrogenation of the aromatic nuclei contained therein, as beyond this limit the capability of such products of protecting the synthetic rubber against the attack of oxygen gradually disappears. The hydrogenation of the condensation products can be performed by introducing hydrogen into a solution thereof in an organic solvent such as methylalcohol or tetrahydrofurane, at an elevated temperature of say about 100 to 200° C. and at a high pressure of about 200 atmospheres. The hydrogenation must be interrupted as soon as the desired stage has been reached. The said hydrogenation serves to more completely exclude any inconvenience regarding the odor which might be caused by traces of unchanged phenols or naphthols, and to still further improve the stability towards light of the vulcanizates obtained from our products. In general, an amount of up to about 3% of our condensation products, either hydrogenated or non-hydrogenated (calculated upon the amount of the synthetic-rubber) is sufficient to exert the desired result.

Our new auxiliary products are not only suitable stabilizing agents for the said synthetic rubber-like materials. They are also capable of exerting a favorable influence upon the course of the oxidizing treatment which is described and claimed in the prior application Ser. No. 196,903 to Albert Koch and Erich Gartner filed March 19, 1938, and serves to effect a further improvement of the plasticity of polymeric butadiene hydrocarbons obtained according to the emulsion polymerization process, and also of the mixed emulsion polymerizates of butadiene hydrocarbons and activated vinyl compounds such as styrene. It is to be understood that our new stabilizing agents fall within the scope of the term "anti-oxidants" as used in the said application Ser. No. 196,903.

Suitable aldehydes or ketones for preparing our stabilizing agents are formaldehyde, acetaldehyde, benzaldehyde, acetone cyclohexanone and the like, whereas the phenols and naphthols may contain various substituents such as alkyls or halogens.

The following examples illustrate the invention without being restricted thereto, the parts being by weight.

EXAMPLE 1

51 parts of a condensation product prepared by causing 12 parts of a 30% formaldehyde solution to react with 25 parts of a crude cresol in the presence of 0.5 part of concentrated hydrochloric acid at 70° C., separating the resin from the water and removing the excess cresol by evaporation at 180° C. and 18 mm. pressure, are dissolved in the necessary amount of a n-caustic soda lye and then incorporated while stirring within an aqueous emulsion of 1700 parts of a mixed polymerizate of 75 per cent of butadiene and 25 per cent of acrylic acid nitrile prepared as described in Patent No. 1,973,000 to Erich Konrad and Eduard Tschunkur. Thereupon coagulation of the emulsion is effected by acidification by means of acetic acid followed by the addition of a saturated sodium chloride solution.

In the following tables the properties of the resulting solid product are defined in figures indicating the plasticity of the crude unvulcanized product, on an unvulcanized rubber mixture prepared therefrom, and the mechanical properties of the vulcanizates prepared from the said mixture. The plasticity (A) has been defined by measuring the strength in grams which is necessary for compressing within 30 seconds a 10 mm. high cylinder of the material to be tested to a height of 4 mm. The symbols (B), (C), (D), and (E) indicate the tensile strength (in kg. per square centimeter), the elongation and the elasticity in per cent and the hardness of the vulcanizate (in degree Shore.)

In the following tables (a) shows the properties of the product stabilized as defined above, whereas in case of the symbols (b) and (c) the above condensation product has been replaced by an equal amount of the uniform products R.CH₂.R and R.CH₂.R.CH₂.R, R being the radicle of p-cresol.

Table I shows the plasticity of the unvulcanized crude product and the plasticity of an unvulcanized mixture and the mechanical properties of the vulcanizates obtained therefrom, the composition of the mixture being as follows:

| | Parts |
|---|---|
| Above stabilized product | 100 |
| Carbon black | 50 |
| Zinc oxide | 5 |
| Stearic acid | 2 |
| Cautchol | 2 |
| Sulfur | 1 |
| Accelerator | 1 |

Table II gives the mechanical properties of vulcanizates of a mixture of the following composition:

| | Parts |
|---|---|
| Above stabilized product | 100 |
| Zinc oxide | 10 |
| Titanium dioxide | 20 |
| Sulfur | 1 |
| Accelerator | 1 |

Table III shows the gradual increase in plasticity which is observed upon subjecting the stabilized synthetic rubber to an oxidizing treatment in the heat in accordance with application Ser. No. 196,903.

Table I

| | A | | B | C | D | E |
|---|---|---|---|---|---|---|
| | Crude product | Mixture | | | | |
| (a) | 3,100 | 5,050 | 277 | 560 | 38 | 74 |
| (b) | 3,100 | 5,100 | 285 | 560 | 38 | 74 |
| (c) | 3,100 | 5,500 | 279 | 555 | 36 | 75 |

Table II

| | B | C | D | E |
|---|---|---|---|---|
| (a) | 113 | 640 | 49 | 64 |
| (b) | 131 | 660 | 50 | 64 |
| (c) | 121 | 630 | 49 | 64 |

Table III

| Time in minutes | a | b | c |
|---|---|---|---|
| 0 | 2,250 | 2,200 | 2,200 |
| 40 | 1,350 | 1,100 | 1,550 |
| 80 | 1,300 | 975 | 1,200 |
| 120 | 1,175 | 825 | 1,100 |
| 160 | 1,100 | 800 | 925 |

EXAMPLE 2

23 parts of di-(p-cresol)-methane are dissolved in the necessary amount of n-caustic soda lye and incorporated while stirring within the aqueous emulsion of 770 parts of a product of the conjoint polymerization of 75% of butadiene and 25% of styrene. The synthetic rubber is isolated as described in Example 1. Table IV shows the figures obtained from this product, the composition of the mixture for vulcanization corresponding to that of Table I:

Table IV

| A | | B | C | D | E |
|---|---|---|---|---|---|
| Crude product | Unvulcanized mixture | | | | |
| 3,700 | 5,100 | 262 | 680 | 51 | 69 |

The next table corresponds to Table III in that it shows the effect of the oxidizing treatment of the process of application Ser. No. 196,903.

Table V

| Time in minutes | Plasticity |
|---|---|
| 0 | 3,700 |
| 30 | 650 |
| 60 | 400 |

Similar results have been obtained with the following products:

(a) Di-(β-naphthol)-methane.
(b) Di-(4.4'-chlorophenol)-methane.
(c) Condensation product of formaldehyde and 3.5-xylenol obtained as described in Example 1.
(d) Condensation product of acetaldehyde and a crude cresol obtained as described in Example 1.
(e) Condensation product of benzaldehyde and a crude cresol obtained as described in Example 1.
(f) Condensation product of acetone and a crude cresol obtained as described in Example 1.
(g) Di-(phenol)-cyclohexane.

EXAMPLE 3

35 parts of a condensation product which has been obtained as described in Example 1 from crude cresol and formaldehyde in the molar proportion of 2:1 and has been subsequently subjected to a hydrogenating process until it has taken up 13% of the amount of hydrogen which would be necessary for hydrogenating every aromatic nucleus contained therein, are suspended in 200 parts of a 4.2% aqueous solution of sodium isobutylnaphthalene sulfonic acid by means of a mixer. The suspension is incorporated while stirring within an emulsion of 1260 parts of the synthetic rubber as described in Example 2. Precipitation is effected as described in Example 1. The resulting product has proved to be excellently stable on storing and is capable of being quickly plasticized if subjected to the oxidizing treatment as described in application Ser. No. 196,903. The unvulcanized product as well as the vulcanizates thereof are free from any disagreeable odor and are stable towards light.

The following table shows the improvement in plasticity obtained upon subjecting the stabilized product to the oxidizing treatment as described in application Ser. No. 196,903:

Table VI

| Time in minutes | Plasticity |
|---|---|
| 0 | 3,550 |
| 40 | 1,200 |
| 80 | 500 |
| 120 | 400 |

We claim:
1. The process of stabilizing synthetic rubber-like materials which comprises incorporating within a latex of a synthetic rubber-like material, this latex having been obtained by the emulsion polymerization of unsaturated compounds selected from the group consisting of butadienes-1.3 and mixtures of butadienes-1.3 with other polymerizable compounds capable of forming copolymerizates with butadienes 1.3, a small amount of product of the condensation of a hydroxy compound selected from the group consisting of phenols and naphthols with an organic carbonyl compound selected from the group consisting of aldehydes and ketones, these condensation products being soluble in organic solvents, and effecting precipitation of the said latex.

2. The process as claimed in claim 1 wherein as condensation product there is employed a product of the reaction of cresol and formaldehyde.

3. The process as claimed in claim 1 wherein such condensation products of the character described are employed as have been hydrogenated to a degree at which at the most 50 per cent of the amount of hydrogen has been taken up which is necessary for effecting complete hydrogenation of the aromatic nuclei contained therein.

HANS MURKE.
WILHELM BECKER.